(12) United States Patent
Myllymaki et al.

(10) Patent No.: US 8,126,459 B2
(45) Date of Patent: Feb. 28, 2012

(54) CONTROLLING REGISTRATION IN A COMMUNICATION SYSTEM

(75) Inventors: Minna Myllymaki, Tampere (FI); Miikka Poikselka, Espoo (FI)

(73) Assignee: Nokia Siemens Networks Oy, Espoo (FI)

( * ) Notice: Subject to any disclaimer, the term of this patent is extended or adjusted under 35 U.S.C. 154(b) by 98 days.

(21) Appl. No.: 10/812,189

(22) Filed: Mar. 30, 2004

(65) Prior Publication Data

US 2005/0124341 A1 Jun. 9, 2005

(30) Foreign Application Priority Data

Dec. 5, 2003 (FI) .................................. 20031784

(51) Int. Cl.
*H04W 4/00* (2009.01)
(52) U.S. Cl. ............... 455/435.1; 455/435.2; 455/435.3; 370/254; 370/389; 370/401
(58) Field of Classification Search ............. 455/435.1, 455/433, 435.2, 435.3; 370/254, 389, 401
See application file for complete search history.

(56) References Cited

U.S. PATENT DOCUMENTS

| | | | | |
|---|---|---|---|---|
| 5,077,790 A * | 12/1991 | D'Amico et al. ............. 380/249 |
| 5,422,940 A * | 6/1995 | Endo et al. ............... 379/221.09 |
| 5,553,315 A * | 9/1996 | Sobti et al. .................. 455/509 |
| 5,666,652 A * | 9/1997 | Lin et al. .................. 455/435.1 |
| 5,764,730 A * | 6/1998 | Rabe et al. .................. 455/403 |
| 5,978,669 A * | 11/1999 | Sanmugam .................. 455/410 |
| 6,108,540 A * | 8/2000 | Sonti et al. .................. 455/433 |
| 6,115,613 A * | 9/2000 | Jonsson ..................... 455/519 |
| 6,311,063 B1 * | 10/2001 | Valliani et al. ............... 455/433 |
| 6,324,399 B1 * | 11/2001 | Salmivalli .................. 455/433 |
| 6,411,816 B1 * | 6/2002 | McDonald et al. ........... 455/518 |
| 6,501,948 B1 * | 12/2002 | Salin ........................ 455/417 |
| 6,697,620 B1 * | 2/2004 | Lamb et al. ............... 455/432.1 |
| 6,778,828 B1 * | 8/2004 | Chander et al. ........... 455/435.1 |
| 2003/0108000 A1 * | 6/2003 | Chaney et al. .............. 370/260 |
| 2005/0009520 A1 * | 1/2005 | Herrero et al. ............ 455/435.1 |
| 2005/0037746 A1 * | 2/2005 | Ramalho et al. ........... 455/422.1 |

OTHER PUBLICATIONS

3rd Generation Partnership Project; Technical Specification Group Services and System Aspects; IP Multimedia Subsystem (IMS); Stage 2 (Release 6), 3GPP TS 23.228, v6.2.0 (Jun. 2003).

* cited by examiner

*Primary Examiner* — Temica Beamer
*Assistant Examiner* — Shantell L Heiber
(74) *Attorney, Agent, or Firm* — Squire Sanders (US) LLP (57) ABSTRACT

A method for controlling registration in a communication system is provided. In the method, a request for registration of a user relating to a subscriber is received in a network entity. The method further comprises providing the network entity with control information associated with at least one limitation regarding simultaneous registrations allowed for the subscriber or the user and controlling the registration based on the control information. Furthermore, a communication system and a network entity configured to control a registration are provided.

57 Claims, 7 Drawing Sheets

CONTROLLING REGISTRATION IN A COMMUNICATION SYSTEM

FIELD OF THE INVENTION

The invention relates to communication systems, and more particularly to controlling registrations in a communication system.

BACKGROUND OF THE INVENTION

A communication system can be seen as a facility that enables communication sessions between two or more entities such as user equipment and/or other nodes associated with the communication system. The communication may comprise, for example, voice, data, multimedia and so on. A user equipment may, for example, be provided with a two-way telephone call, multi-way conference call or a data communication session. A user equipment may also be provided with a connection to an application server (AS) which enables use of services provided by the application server.

A communication system typically operates in accordance with a given standard or specification which sets out what the various entities associated with the communication system are permitted to do and how that should be achieved. For example, the standard or specification may define if the user or, more precisely, user equipment is provided with a circuit switched service and/or a packet switched service. Communication protocols and/or parameters which shall be used for the connection may also be defined. In other words, a specific set of "rules" on which the communication can be based on needs to be defined to enable communication by means of the system.

Examples of communication systems may include fixed line communication systems, such as a public switched telephone network (PSTN), wireless communication systems, such as a public land mobile network (PLMN) and/or other communication networks, such as an Internet Protocol (IP) network and/or other packet switched data networks. Various communication systems may simultaneously be concerned in a connection.

The PSTN is a circuit switched communication system providing telephone call services, electronic mail (email) functionalities, facsimile services and so on for fixed line user equipment.

The PLMNs are typically based on cellular technology. In cellular systems, a base transceiver station (BTS) or similar access entity serves wireless user equipment (UE), such as mobile stations (MS), via a wireless interface between these entities. The communication on the wireless interface between the user equipment and the elements of the communication network can be based on an appropriate communication protocol. The operation of the base station apparatus and other apparatus required for the communication can be controlled by one or several control entities. The various control entities may be interconnected. One or more gateway nodes may also be provided for connecting the cellular network to other networks.

An example of the services that may be offered for users or subscribers by a communication system is the so called multimedia services. An example of the communication systems enabled to offer multimedia services is the Internet Protocol (IP) Multimedia network. IP Multimedia (IM) functionalities can be provided by means of an IP Multimedia Core Network (CN) subsystem, or briefly IP Multimedia subsystem (IMS). The IMS includes various network entities for the provision of the multimedia services.

The third generation partnership project (3GPP) has defined use of the general packet radio service (GPRS) as a backbone communication system for the provision of the IMS services. Therefore, the GPRS will be used in this specification as an example of a possible backbone communication system enabling the multimedia services. The 3G PP has also defined a reference architecture for the third generation (3G) core network which will provide the users of user equipment with access to the multimedia services. This core network is divided into three principal domains. These are the Circuit Switched (CS) domain, the Packet Switched (PS) domain and the Internet Protocol Multimedia Core Network Subsystem (IMS) domain. The last of these, the IMS domain, is for ensuring that multimedia services are adequately managed. The 3GPP IMS domain uses the Session Initiation Protocol (SIP) developed by the Internet Engineering Task Force (IETF) for creating, modifying and terminating sessions with one or more participants (endpoints).

It is expected that various types of services are to be provided to users by means of different Application Servers (AS) over IMS systems. User or several users related to the same subscriber may be able to use services simultaneously from different contact addresses, such as from different user equipment. In certain cases, the use of the same service by one user or several users related to the same subscriber from several contact addresses may cause capacity problems for example in charging the services. It might in certain cases be desirable to be able to provide different service classes depending on the subscriber or user. Furthermore, capability of controlling simultaneous registrations by a single user or several users related to the same subscriber might be useful for other reasons, such as fraud prevention.

These issues are not limited to 3GPP environments, but may occur in other communication systems as well. There is therefore a need for providing a way of controlling, such as counting or limiting, simultaneous registrations for services by a single subscriber or user in communication system providing services.

SUMMARY OF INVENTION

Embodiments of the invention aim to address one or several of the above problems or issues.

In accordance with an aspect of the invention, there is provided a method for controlling registration in a communication system, the method comprising receiving a request for registration of a user relating to a subscriber in a network entity, providing the network entity with control information associated with at least one limitation regarding simultaneous registrations allowed for the subscriber or the user and controlling the registration based on the control information. The subscriber may comprise one or more users.

In an embodiment, the method further comprises checking if at least one limitation regarding simultaneous registrations is infringed by allowing the registration. In the event that the checking shows that at least one limitation regarding simultaneous registrations is infringed by allowing the registration, the controlling step may comprise denying the registration. In the event that the checking shows that no limitation regarding simultaneous registrations is infringed by allowing the registration, the controlling step may comprise allowing the request for registration.

In an embodiment, the limitation may be a number of simultaneous registrations allowed for the subscriber, such as a maximum number of simultaneous registrations allowed for the subscriber.

In another embodiment, the limitation may relate to a service type allowed for simultaneous registrations for the subscriber.

The control information may be stored in a user information storage entity, such as a home subscriber server. In an embodiment, the checking may be performed in the user information storage entity. In an embodiment, a request for subscriber information may be sent from said network entity to the user information storage entity. The control information may be provided from the user information storage entity to said network entity. In a further embodiment, the checking may be performed in the network entity. The network entity may be one of a serving controller, an interrogating controller and an entity of an IP Multimedia Core Network Subsystem.

In accordance with another aspect of the invention, there is provided a communication system comprising a network entity configured to receive requests for registration of users relating to subscribers providing means configured to provide the network entity with control information associated with at least one limitation regarding simultaneous registrations allowed for subscribers and controlling means configured to control the registration of a user relating to a subscriber based on the control information.

In accordance with a further aspect of the invention, there is provided a network entity configured to receive requests for registration of users relating to subscribers, receive control information associated with at least one limitation regarding simultaneous registrations allowed for subscribers and control the registration of a user relating to a subscriber based on the control information.

BRIEF DESCRIPTION OF FIGURES

The invention will now be described in further detail, by way of example only, with reference to the following examples and accompanying drawings, in which.

DETAILED DESCRIPTION OF PREFERRED EMBODIMENTS

Certain embodiments of the invention will be described in the following by way of example, with reference to the exemplifying architecture of a third generation (3G) wireless communication system. However, it shall be appreciated that the embodiments may be applied to any suitable communication system.

Figure 1:
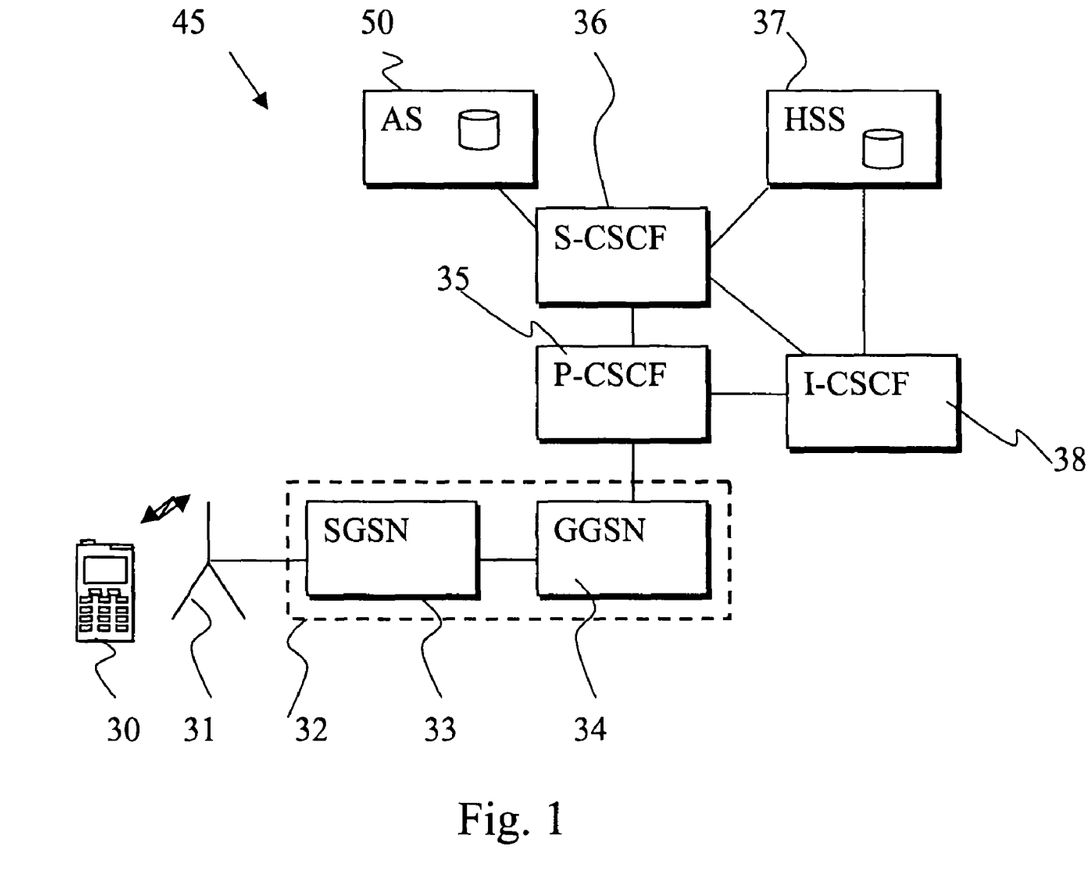
FIG. 1 shows an example of a network architecture in which the embodiments of the invention may be implemented.

Reference is made to FIG. 1 showing an example of a network architecture in which the embodiments of the invention may be implemented. In FIG. 1, an IP Multimedia Core Network Subsystem (IMS) 45 is provided for offering IP multimedia services for IMS subscribers. In the arrangement of FIG. 1, a base station 31 is arranged to transmit signals to and receive signals from a user equipment 30 of a user via a wireless interface between the user equipment and a radio access network. Correspondingly, the user equipment is able to transmit signals to and receive signals from the radio access network via the wireless interface.

In the arrangement of FIG. 1, the user equipment 30 may access the IMS 45 via the access network associated with the base station 31, respectively. It shall be appreciated that, although for clarity reasons FIG. 1 shows a base station of only one radio access network, a typical communication network system usually includes a number of radio access networks.

The 3G radio access network (RAN) is typically controlled by appropriate radio network controller (RNC). This controller is not shown in FIG. 1 in order to enhance clarity. A controller may be assigned for each base station or a controller can control a plurality of base stations, for example in the radio access network level. It shall thus be appreciated that the name, location and number of the network controllers depend on the system.

The user equipment 30 may comprise any appropriate device allowing a user access to network services. For example, the user may access the IMS by means of a personal computer (PC), personal digital assistant (PDA), user equipment (UE), mobile station (MS) and so on. The following examples are described in the context of user equipment.

One skilled in the art is familiar with the features and operation of a typical user equipment. Thus, it is sufficient to note that the user may use a user equipment for tasks such as for making and receiving phone calls, for receiving and sending data from and to the network and for experiencing multimedia content or otherwise using multimedia services. A user equipment may include an antenna for wirelessly receiving and transmitting signals from and to base stations of a mobile communication network. A user equipment may also be provided with a display for displaying images and other graphical information for the user of the user equipment. Camera means may be provided for capturing still or video images. Speaker means are also typically provided. The operation of a user equipment may be controlled by means of an appropriate user interface such as control buttons, voice commands and so on. Furthermore, a user equipment is provided with a processor entity and a memory means.

It shall be appreciated that although only one user equipment is shown in FIG. 1 for clarity, a number of user equipment may be in simultaneous communication with base stations of a wireless communication system.

The core network (CN) entities typically include various switching and other control entities and gateways for enabling the communication via a number of radio access networks and also for interfacing a single communication system with one or more communication systems, such as with other cellular systems and/or fixed line communication systems. In the 3GPP systems, the radio access network controller is typically connected to an appropriate core network entity or entities such as, but not limited to, a serving general packet radio service support node (SGSN) 33. The radio access network controller is in communication with the SGSN via an appropriate interface, for example on an Iu interface.

The SGSN, in turn, typically communicates with a gateway GPRS support node (GGSN) via the GPRS backbone network 32. This interface may be a switched packet data interface.

In a 3GPP network, a packet data session is established to carry traffic flows over the network. Such a packet data session is often referred to as a packet data protocol (PDP) context. A PDP context may include a radio bearer provided between the user equipment and the radio network controller, a radio access bearer provided between the user equipment, the radio network controller and the SGSN, and switched packet data channels provided between the SGSN and the GGSN. Each PDP context usually provides a communication pathway between a particular user equipment and the GGSN and, once established, can typically carry multiple flows. Each flow normally represents, for example, a particular service and/or a media component of a particular service. The PDP context therefore often represents a logical communication pathway for one or more flow across the network. To implement the PDP context between user equipment and the SGSN, radio access bearers (RAB) need to be established which commonly allow for data transfer for the user equipment. The implementation of these logical and physical channels is known to those skilled in the art and is therefore not discussed further herein.

FIG. 1 shows an application server 50. The user equipment 30 may connect, via the GPRS network, to the application server that is connected to one or more data networks such as, but not limited to, the exemplifying Internet Protocol (IP) network. It shall be appreciated that a great number of application servers may be connected to each data network.

The communication systems have developed in the direction wherein services are provided for the user equipment by means of various functions of the data network that are handled by controller entities, such as servers. For example, in the current third generation (3G) wireless multimedia network architectures, it is assumed that several different servers providing various control functions are used for the service provision control. These include functions such as the call session control functions (CSCFs). The call session control functions may be divided into various categories such as a proxy call session control function (P-CSCF), interrogating call session control function (I-CSCF), and serving call session control function (S-CSCF). It shall be appreciated that similar functions may be referred to in different systems with different names. For example, in certain applications the CSCFs may be referenced to as the call state control functions.

A user who wishes to use services provided by the IMS may need first to register with a serving controller, such as the serving call session control function (S-CSCF) 36. As shown in FIG. 1, communication between the S-CSCF 36 and the user equipment 30 may be routed via at least one proxy call session control function (P-CSCF) 35. The P-CSCF 35 is thus for proxying messages to the S-CSCF 36. The serving controller, i.e. S-CSCF 36 in FIG. 1, in turn, provides the control entity the user equipment 30 needs to be registered with. The registration is required, for example, to enable the user equipment to request for a service from an application server (AS) or running end-to-end applications with another user equipment. In certain cases, the S-CSCF may find that the total number of registration processes at a certain moment is too much for the capacity of the S-CSCF. In such a case, the S-CSCF may reject a registration request by sending a response forbidding the registration.

The system of FIG. 1 is further arranged such that a user who has been provided with required communication resources by the backbone network and is registered to the serving controller 36. When a user initiates any request, the request traverses through the serving controller.

A user information storage entity may also be provided for storing information associated with a subscription of a user or a subscriber of the respective user equipment. The user information storage entity may locate in a server of the home network of the subscription. Such subscriber information storage entities may be called by different terms in different communication systems, examples being a Home Location Register (HLR) in the Global System for Mobile Communications (GSM) or a Home Subscriber Server (HSS) in the IMS. In the particular embodiment illustrated in FIG. 1, the storage entity is shown to be provided by means of a home subscriber server (HSS) 37. The HSS 37 can be queried by other function entities over the appropriate reference points, e.g. during session set-up procedures and later. The subscriber information may include information such as data required for authentication purposes (e.g. registration identities of the subscriber or the user equipment) and so on. The HSS 37 can also be used for storing permanently subscriber profile information.

Typically, a subscriber is associated with one or more subscriptions and a subscription, in turn, may be used by one user or a plurality of users. A subscription may, for example, be subscribed by a company giving the subscription in use for several users. A user or a plurality of users associated with the same subscription may have simultaneous registrations from different contact addresses using different equipment, such as a UE, PDA or PC. A user may also use different functions of an equipment.

Figure 2:
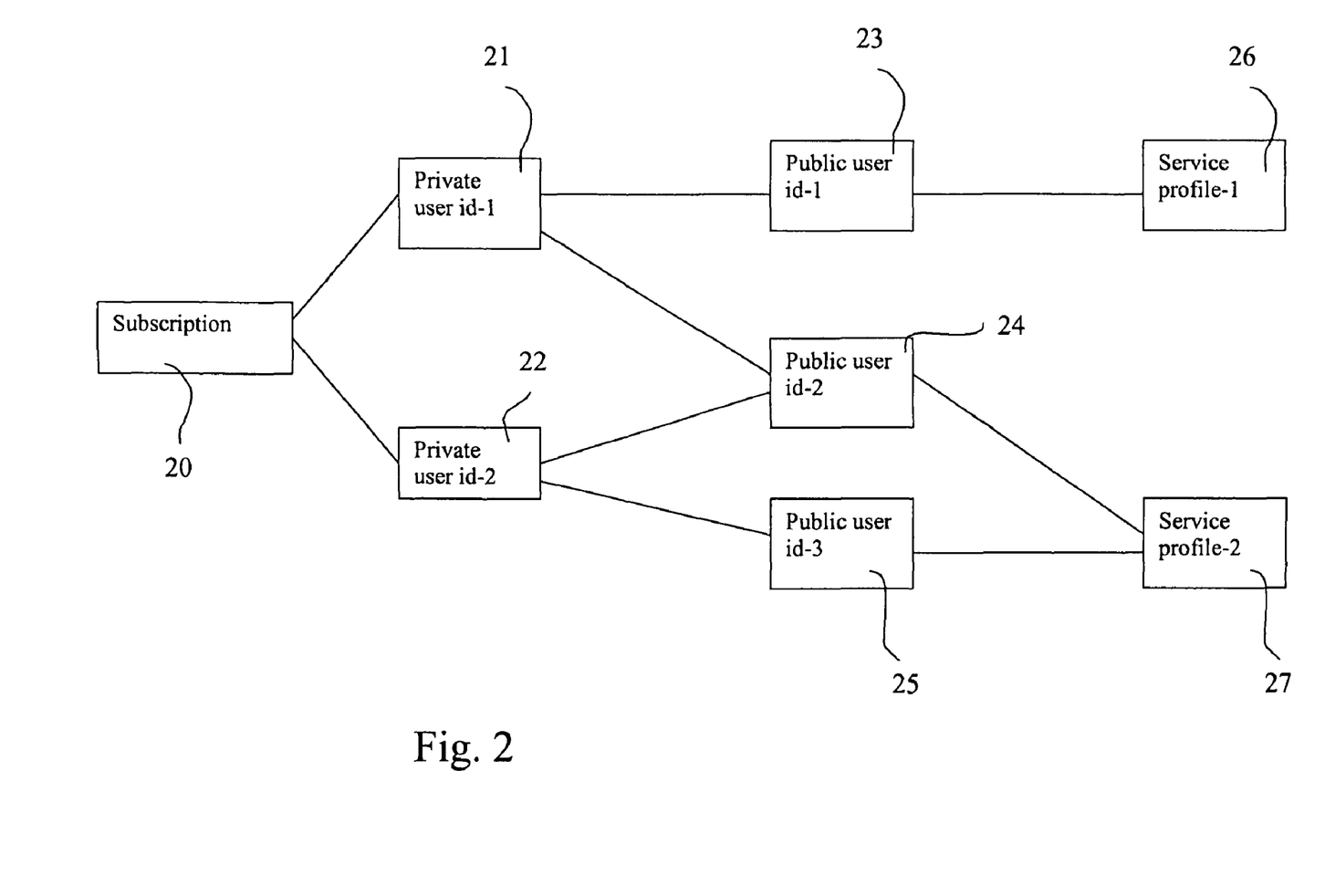
FIG. 2 shows the relationship of various user identities.

The embodiments of the invention are based on the realisation that it might be advantageous to be able to control the simultaneous registrations of a user or registrations of several users sharing the same subscription or a group of subscriptions, i.e. to control the simultaneous registrations of a subscriber, to a particular service or a group of services from multiple contact addresses. When using services, such as IMS services, a subscriber may be associated with various identities. This is illustrated in FIG. 2. A subscriber may have one or more subscriptions 20. A subscription may be identified by one or more so called private user identities 21, 22. The private user identity is a unique global identity typically assigned by the home network. One private user identity 21 may relate to one or more so called public user identities 23, 24. A public user identity 24 may, in turn, be shared between more than one private user identities 21, 22 introduced or included, for example, in user equipment. Therefore, a particular public user identity 24 may be simultaneously registered from multiple user equipment using different private user identities 21, 22 and different contact addresses. This allows, for example, a company to give out a single contact information (e.g. helpdesk@company.net) for multiple users.

An IMS subscription can contain several private identities of which each correspond to a contact address. Each private identity can be related to one or more public identities that can be shared with other private identities within the IMS subscription. The public identities are registered to the IMS using the private identity and each private identity—public identity pair has it's own registration status. Therefore, as is clear from FIG. 2, the public identity 24, may be simultaneously registered to the IMS trough the private identities 21 and 22.

The user information storage entity, such the HSS in the IMS, may know all the private identities related to a subscriber. The user information storage entity may thus count the number of the contact addresses registered by a subscriber. In an embodiment, the user information storage entity may be configured to control the number of simultaneous registrations for a service or a group of services allowed for a particular subscriber or user. The embodiments are described referring to the IMS, but the same idea may be implemented with other communication systems as well.

In the IMS, the serving controller, such as the S-CSCF, may be enabled to query information from the user information storage entity, such the HSS. As mentioned above, the user information storage entity stores subscriber related information. In an embodiment of the invention, the user information storage entity may include information associated with at least one limitation regarding simultaneous registrations allowed for a subscriber or a user. It shall be appreciated that a subscriber may include only one user or more than one users sharing a subscription subscribed by the subscriber or having separate subscriptions subscribed by the subscriber, as is explained above.

The limitation may be a number of simultaneous registrations, for example the maximum number of simultaneous registrations, allowed for the subscriber or user. The number of simultaneous registrations may be selected based on various conditions. The conditions may include nature of subscription, such as credit rating, risk of fraudulence or subscriber's own wishes concerning service classes or maximum number of simultaneous registrations, for example in a case of a company allowing several users to use the same public user identity. The conditions may further include network capacity or charging capacity.

The limitation may relate to a service type allowed for simultaneous registrations for the subscriber. The service type may include, but is not limited to, circuit switched (CS) and packet switched (PS) services. For example, simultaneous registrations in the CS and PS networks may be limited.

The above mentioned limitations and conditions are given only as examples and the embodiments of the invention may use any appropriate conditions or rules to select the limitations for simultaneous registrations allowed for a certain subscriber, user or public user identity. The selection may be made, for example, by the operator of the subscriber's home network. Preferably, the limitation relating to the simultaneous registrations relate to one specific network.

Figure 3A:
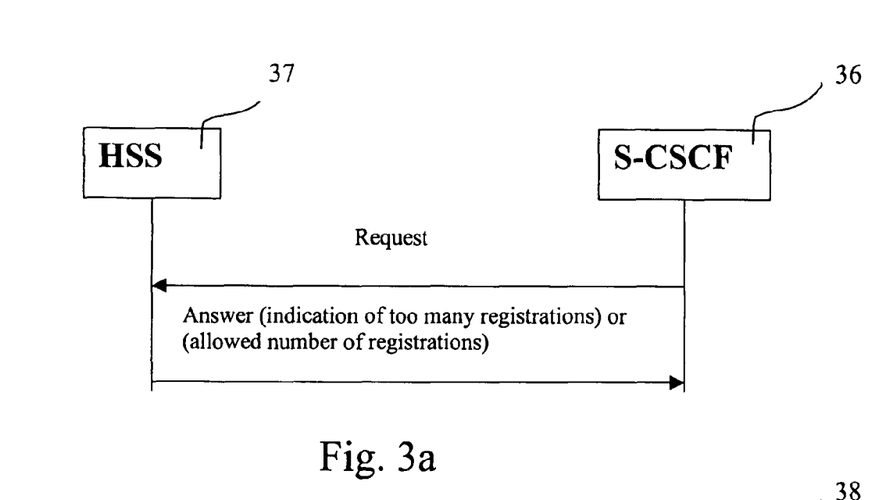
FIG. 3a shows an exemplifying signalling flowchart for an embodiment of the invention.
Figure 3B:
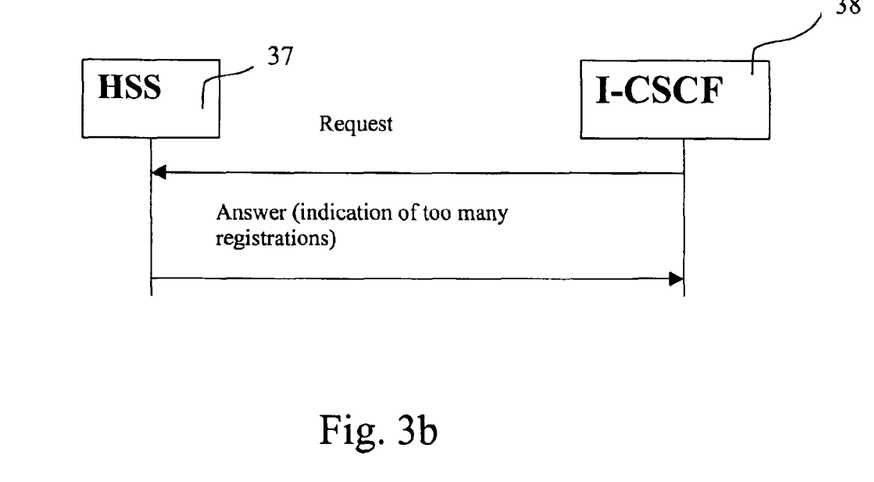
FIG. 3b shows an exemplifying signalling flowchart for a further embodiment of the invention.

Certain exemplifying embodiments are now described referring to FIGS. 3a and 3b. During the registration, the serving controller 36, such as the S-CSCF, may communicate with the user information storage entity 37, such as the HSS, to exchange information related to the registration. The serving controller may ask authorisation related data and checking access permission from the user information storage 37 by sending a specified request, such as a multimedia authentication request (MAR). The serving controller may request the user information storage entity 37 to store the identification information of the serving controller 36 currently serving the subscriber and to request downloading of necessary parts of the user profile by sending a specified request, such as a server assignment request (SAR). Typically, the user information storage entity 37 may respond to said request (e.g. MAR) by sending the information related to the user authorisation to the serving controller 36, for example in a multimedia authentication answer (MAA) or the user information storage entity 37 may respond to said request (e.g. SAR) by sending the current user information to the serving controller 36, for example in a server assignment answer (SM).

In a further embodiment, querying controller 38, such as the I-CSCF, may request the user information storage entity 37 to inform which serving controller is serving a particular user or what are the required capabilities for the appropriate serving controller. The querying controller may ask this information from the user information storage 37 by sending a specified request, such as a user authorisation request (UAR). Typically, the user information storage entity 37 may respond to said request by sending the name of the serving controller or capabilities of serving controller to the querying controller 38, for example in a user authorisation answer (UAA).

In the above embodiments, at least one limitation relating to simultaneous registrations allowed for a subscriber associated with the user requesting the registration is set. In these examples, the limitation relates to a number of simultaneous registrations allowed for the subscriber. The number may be a maximum number of simultaneous registrations allowed for the subscriber. The user information storage entity 37 may check if the allowed number is reached by the current registration or if it has already been exceeded. In the event that the allowed number of simultaneous registrations for the subscriber has been reached earlier, the user information storage entity 37 may send and error indication within the MAA or SAA or UAA to the serving controller 36 indicating that no registration should be allowed. This is illustrated in FIGS. 3a and 3b. In the IMS, the MAA or SAA or UAA command could include a specific code indicating that there are too many registrations, for example in the form (DIAMETER-_ERROR_TOO_MANY_REGISTRATIONS). It may be possible to define other codes defining similar information. In other communication systems, a similar code may be defined.

In a further embodiment also illustrated in FIG. 3a, the user information storage entity 37 may send the current user information to the serving controller 36 and include the allowed number of simultaneous registrations for a subscriber associated with the user requesting the registration. As mentioned above, in the IMS, the user information may be sent to the serving controller 36 for example in a multimedia authentication answer (MAA) or in a server assignment answer (SAA). In case the subscriber information changes, an updating message, such as a push profile answer (PPA), can be send to the serving controller 36. In this embodiment, the serving controller 36 may then check the number of registrations allowed to a particular subscriber. When the allowed number indicated by the user information storage entity 37 is exceeded, the serving controller starts to deny registrations for the user.

Figure 4:
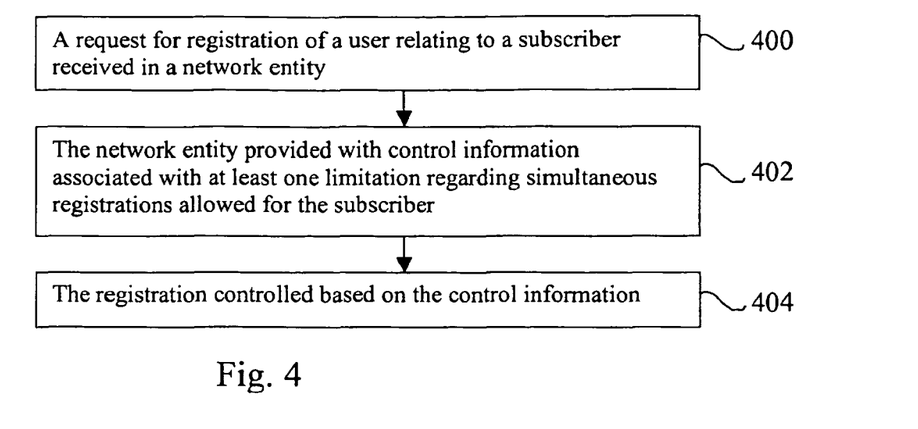
FIG. 4 shows a flow chart illustrating an embodiment of the invention.

FIG. 4 shows a flowchart illustrating an embodiment of the invention. In step 400, a request for registration of a user relating to a subscriber is received in a network entity. In step 402, the network entity is provided with control information associated with at least one limitation regarding simultaneous registrations allowed for the subscriber. In step 404, the registration is controlled based on the control information.

Figure 5:
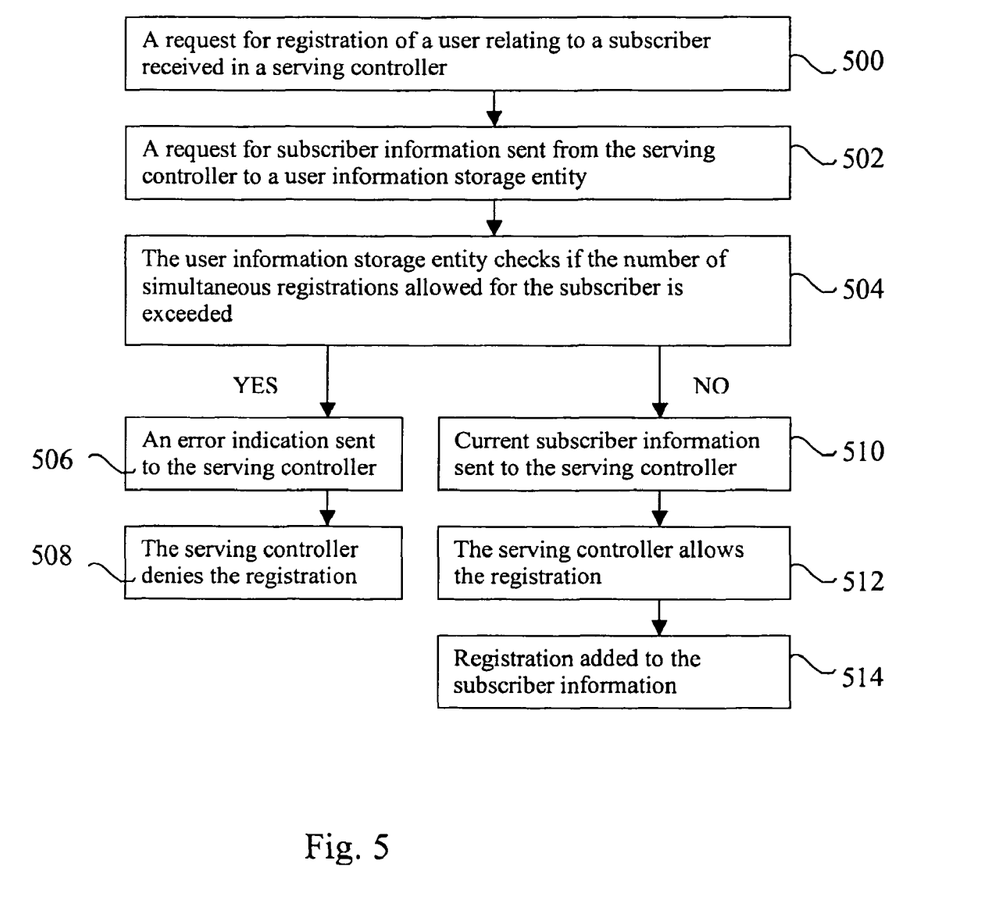
FIG. 5 shows a flow chart illustrating a further embodiment of the invention.

A further embodiment is illustrated in FIG. 5 by means of a flowchart. In the FIG. 5 embodiment, the limitation is selected to be a number of simultaneous registrations allowed for the subscriber. In step 500, a request for registration of a user relating to a subscriber is received in a serving controller. In step 502, a request for subscriber information is sent from the serving controller to a user information storage entity. In step 504, the user information storage entity checks if the number of simultaneous registrations allowed for the subscriber is exceeded. If the allowed number of simultaneous registrations is exceeded, the user information storage entity sends, in step 506, an answer to the request including a specific code indicating too many registrations to the serving controller. The serving controller then denies the requested registration, in step 508. If the allowed number of simultaneous registrations is not exceeded, the user information storage entity sends, in step 510, the current subscriber information to the serving controller. The serving controller then allows the registration, in step 512, and the registration procedure continues in an appropriate manner. The present registration is added in the subscriber information, in step 514.

Figure 6:
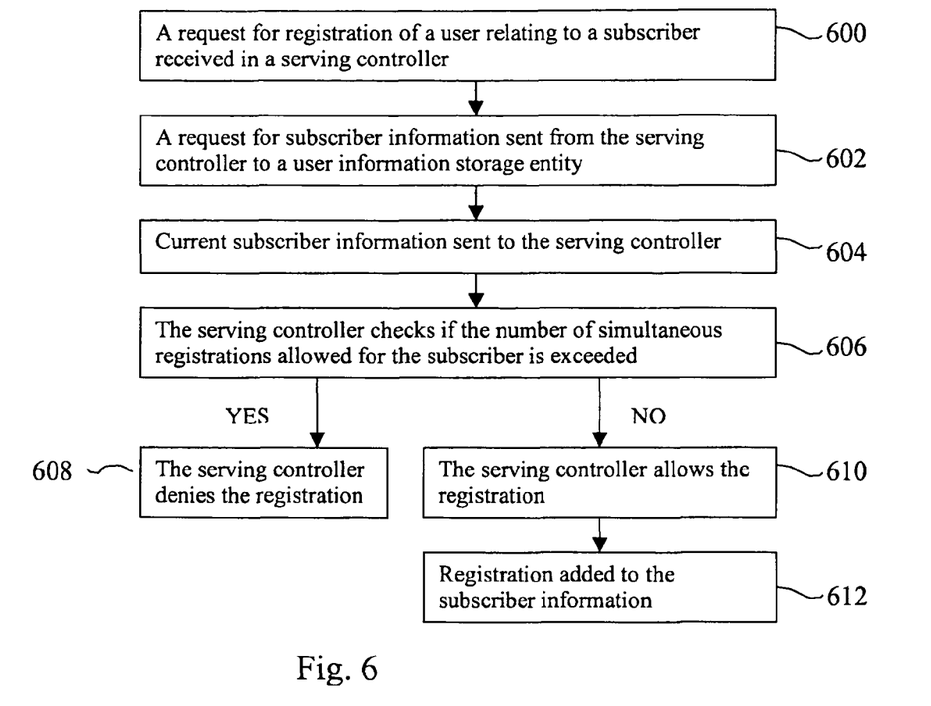
FIG. 6 shows a flow chart illustrating a further embodiment of the invention.

A further embodiment is illustrated in FIG. 6, the limitation being selected to be a number of simultaneous registrations allowed for the subscriber. In step 600, a request for registration of a user relating to a subscriber is received in a serving controller. In step 602, a request for subscriber information is sent from the serving controller to a user information storage entity. In step 604, current subscriber information is sent to the serving controller. In step 606, the serving controller checks if the allowed number of simultaneous registrations for the subscriber is exceeded. If the allowed number of simultaneous registrations is exceeded, the serving controller denies the requested registration, in step 608. If the allowed number of simultaneous registrations is not exceeded, the serving controller allows the registration, in step 610, and the registration procedure continues in an appropriate manner. The present registration is added in the subscriber information, in step 612.

Figure 7:
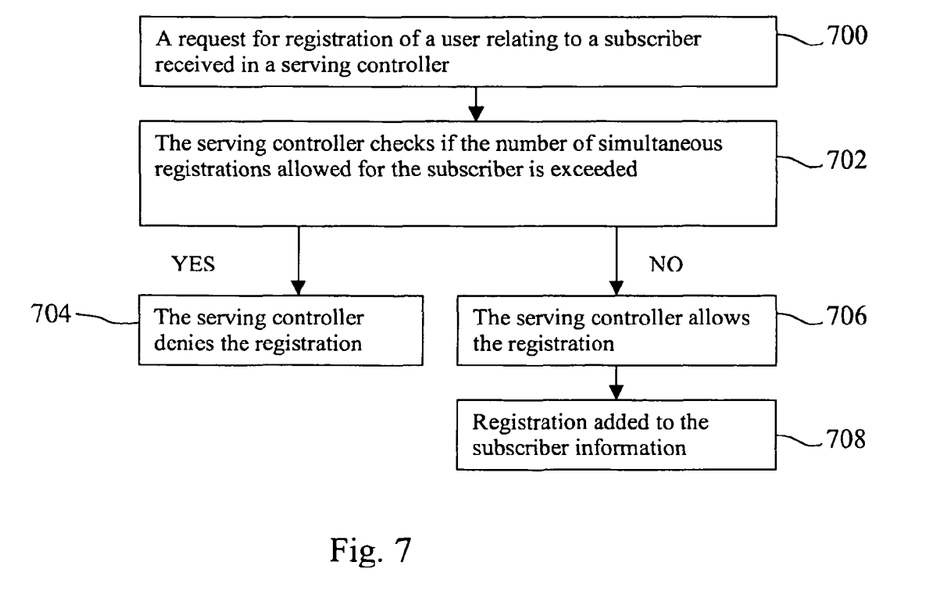
FIG. 7 shows a flow chart illustrating a further embodiment of the invention.

A further embodiment is illustrated in FIG. 7, the limitation being selected to be a number of simultaneous registrations allowed for the subscriber. In step 700, a request for registration of a user relating to a subscriber is received in a serving controller. In step 702, the serving controller checks if the number of simultaneous registrations allowed for the subscriber is exceeded. If the allowed number of simultaneous registrations is exceeded, the serving controller denies the requested registration, in step 704. If the allowed number of simultaneous registrations is not exceeded, the serving controller allows the registration, in step 706, and the registration procedure continues in an appropriate manner. The present registration is added in the subscriber information, in step 708.

Figure 8:
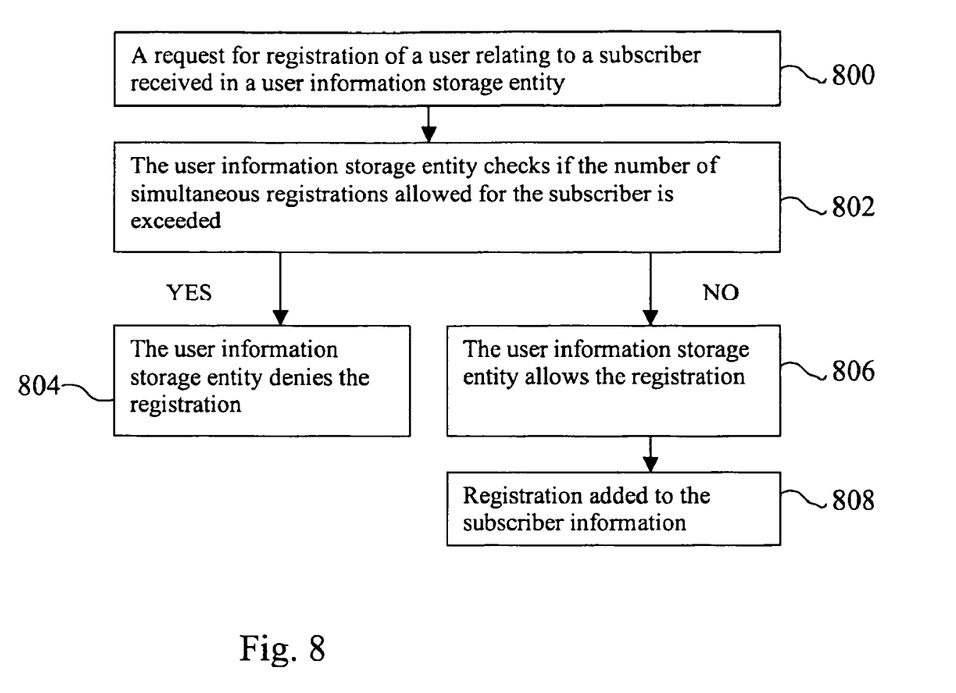
FIG. 8 shows a flow chart illustrating a further embodiment of the invention.

A further embodiment is illustrated in FIG. 8, the limitation being selected to be a number of simultaneous registrations allowed for the subscriber. In step 800, a request for registration of a user relating to a subscriber is received in a user information storage entity. In step 802, the user information storage entity checks if the number of simultaneous registrations allowed for the subscriber is exceeded. If the allowed number of simultaneous registrations is exceeded, the user information storage entity denies the requested registration, in step 804. If the allowed number of simultaneous registrations is not exceeded, the user information storage entity allows the registration, in step 806, and the registration procedure continues in an appropriate manner. The present registration is added in the subscriber information, in step 808.

Figure 9:
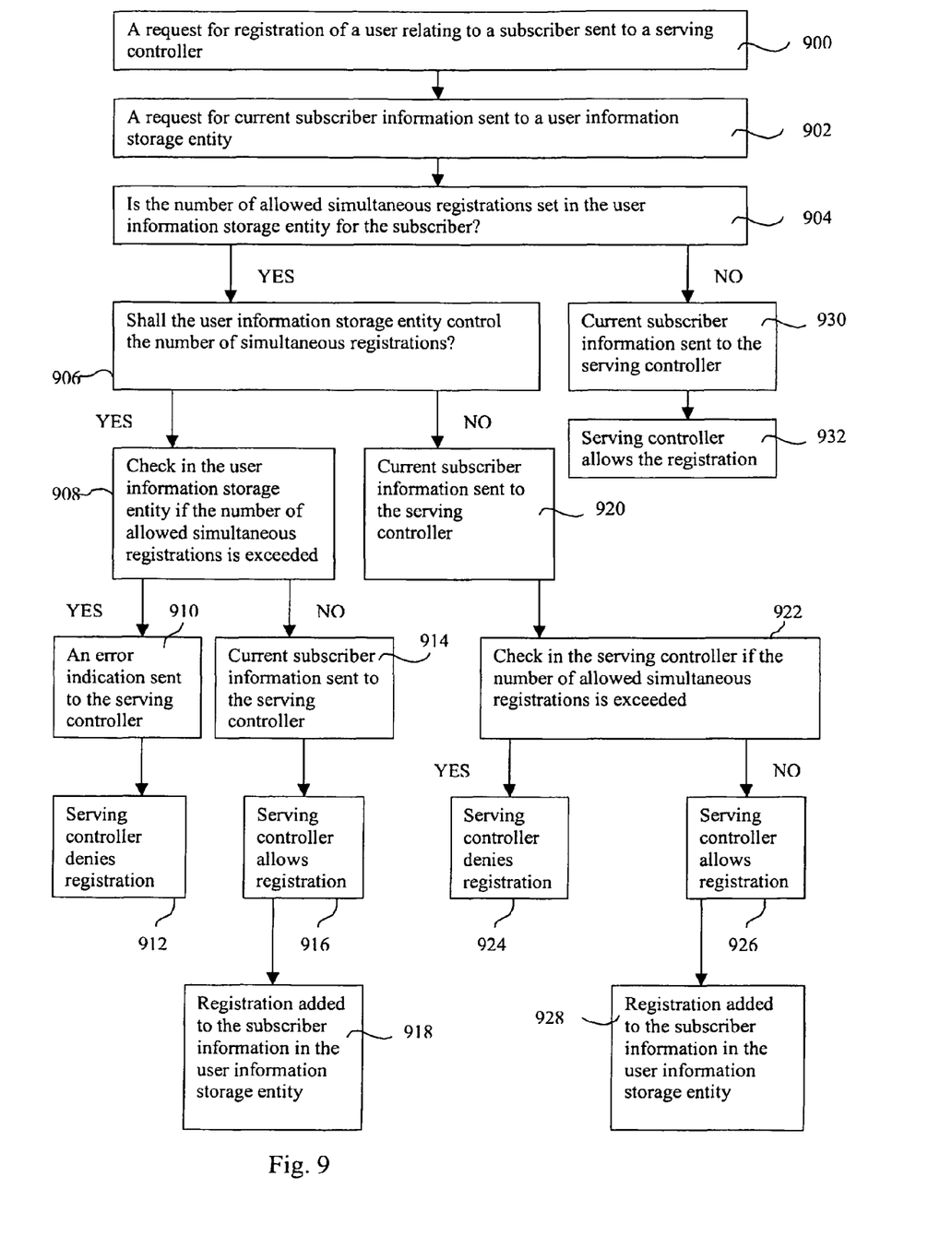
FIG. 9 shows a flow chart illustrating a further embodiment of the invention.

FIG. 9 shows a flowchart illustrating various embodiments of the invention, the limitation being selected to be a number of simultaneous registrations allowed for the subscriber. In step 900, a request for registration of a user relating to a subscriber is sent to a serving controller. In step 902, a request for current user information is sent to a user information storage entity. In step 904, it is checked if a number of allowed simultaneous registrations is set in the user information storage entity for the subscriber in question.

In an embodiment, if the number of allowed simultaneous registrations is set, it is verified, in step 906, if the user information storage entity shall control the number of simultaneous registrations. If it is the responsibility of the user information storage entity to control the number of simultaneous registrations, the user information storage entity checks, in step 908, if the allowed number of simultaneous registrations is exceeded. If the allowed number of simultaneous registrations is exceeded, the user information storage entity sends, in step 910, an answer to the request including a specific code indicating too many registrations to the serving controller. The serving controller then denies registration for the subscriber in question, in step 912. If the allowed number of simultaneous registrations is not exceeded, the user information storage entity sends, in step 914, the current subscriber information to the serving controller. The serving controller then allows the registration for the subscriber in question, in step 916, and the registration procedure continues in an appropriate manner. The present registration is added in the user information in the user information storage entity, in step 918.

In a further embodiment, if the maximum number of simultaneous registrations is set, it is verified, in step 906, if the user information storage entity shall control the number of simultaneous registrations. If it is not the responsibility of the user information storage entity to control the number of simultaneous registrations, the current subscriber information, including the number of allowed simultaneous registrations, is sent to the serving controller, in step 920. In step 922, it is checked in the serving controller if the allowed number of simultaneous registrations is exceeded. If the allowed number of simultaneous registrations is exceeded, the serving controller denies registration for the public user identity in question, in step 924. If the allowed number of simultaneous registrations is not exceeded, the serving controller allows the registration for the public user identity in question, in step 926, and the registration procedure continues in an appropriate manner. In step 928, the service controller then informs the user information storage entity of the registration and the user information storage entity adds the registration in the subscriber information.

In the event that the maximum number of simultaneous registrations is not set, the registration proceeds in the state-of-the-art manner. The current user information is sent to the serving controller, in step 930. The serving controller then allows the registration for the public user identity in question, in step 932.

Although the invention has been described in the context of particular embodiments, various modifications are possible without departing from the scope and spirit of the invention as defined by the appended claims. For example, the communication system used in the various embodiments may be an other communication system, such as the Global System for Mobile Communications (GSM) or a further generation communication system. The serving controller and the user information storage entity may be network entities called with different names in various communication systems. These entities may also carry out various additional tasks. It might also be possible that the serving controller and the user information storage entity are network entities dedicated for the purposes of the embodiments of the invention.

The invention claimed is:

1. A method, comprising:
    receiving at least one registration request to register a user requesting a service in a network entity in an internet protocol multimedia core network subsystem of a communication system;
    providing the network entity with control information indicating at least one limitation on a plurality of simultaneous registrations, said control information indicating a restriction on a number of different contact addresses that can be simultaneously registered using a single public user identity;
    controlling the registration based on the control information;
    checking whether at least one of said at least one limitation on simultaneous registrations would be infringed by allowing the registration; and denying the registration when the checking shows that an allowed number of simultaneous registrations is exceeded.

2. The method according to claim 1, further comprising: determining that at least one user belongs to a same subscription.

3. The method according to claim 1, further comprising: allowing the registration request when the checking shows that none of the at least one limitation on simultaneous registrations would be infringed by allowing the registration.

4. The method according to claim 1, further comprising: indicating with the control information a number of the simultaneous user registrations allowed for a subscription.

5. The method according to claim 4, further comprising: indicating with the control information a maximum number of the simultaneous user registrations allowed for a subscription.

6. The method according to claim 1, further comprising: indicating with the control information a limitation on a service type allowed for the simultaneous user registrations for a subscription.

7. The method according to claim 1, further comprising: storing the control information in a user information storage entity.

8. The method according to claim 7, wherein said storing comprises storing the control information in a home subscriber server.

9. The method according to claim 7, further comprising: sending a request for user subscriber information from said network entity to the user information storage entity.

10. The method according to claim 7, wherein the providing comprises providing the control information from the user information storage entity to said network entity.

11. The method according to claim 1, wherein the checking comprises checking in a user information storage entity.

12. The method according to claim 1, wherein the checking comprises checking in the network entity.

13. The method according to claim 1, wherein said receiving comprises receiving the registration request in at least one of a serving controller and an interrogating controller.

14. The method according to claim 13, wherein the receiving comprises receiving the registration request in the serving controller, and wherein the serving controller comprises a serving call session control function.

15. The method according to claim 13, wherein said receiving comprises receiving the registration request in the interrogating controller, and wherein the interrogating controller comprises an interrogating call session control function.

16. The method according to claim 1, further comprising: counting the simultaneous registrations of the contact addresses.

17. The method according to claim 1, further comprising: indicating with the control information at least one limitation on simultaneous registrations by the contact addresses in relation to one network.

18. A system, comprising:
a network entity configured to receive at least one request to register a user requesting a service in a network entity in an internet protocol multimedia core network subsystem;
a providing unit configured to provide the network entity with control information indicating at least one limitation on a plurality of simultaneous registrations, said control information indicating a restriction on a number of different contact addresses that can be simultaneously registered using a single public user identity;
a controlling unit configured to control the registration based on the control information; and
a checking unit configured to check whether at least one of said at least one limitation on simultaneous registrations by the contact addresses would be infringed by allowing the registration, wherein the controlling unit is further configured to deny the registration when the checking shows that an allowed number of simultaneous registrations is exceeded.

19. The system according to claim 18, wherein the network entity comprises the checking unit.

20. The system according to claim 18, wherein the network entity comprises at least one of a serving controller and an interrogating controller.

21. The system according to claim 20, wherein the serving controller comprises a serving call session control function.

22. The system according to claim 21, wherein the interrogating controller comprises an interrogating call session control function.

23. The system according to claim 18, further comprising:
a storing unit configured to store the control information associated with at least one of said at least one limitation regarding the simultaneous registrations of contact addresses.

24. The system according to claim 23, wherein a user information storage entity comprises the storing unit.

25. The system according to claim 23, wherein a serving controller comprises the storing unit.

26. The system according to claim 18, further comprising: a user information storage entity.

27. The system according to claim 26, wherein the user information storage entity comprises a home subscriber server.

28. The system according to claim 18, wherein a user information storage entity comprises the checking unit.

29. The system according to claim 18, wherein the controlling unit is configured to allow or deny the registration based on the control information.

30. An apparatus, comprising:
receiving means for receiving at least one registration request for registration of a user requesting a service in an internet protocol multimedia core network subsystem;
receiving control means for receiving control information indicating at least one limitation on a plurality of simultaneous registrations, said control information indicating a restriction on a number of different contact addresses that can be simultaneously registered using a single public user identity;
controlling means for controlling the registration based on the control information; and
checking means for checking whether at least one of said at least one limitation on simultaneous registrations by the contact addresses would be infringed by allowing the registration, wherein the controlling means is further configured to deny the registration when the checking means shows that an allowed number of simultaneous registrations is exceeded.

31. The apparatus according to claim 30, wherein the apparatus comprises at least one of serving controller means, interrogating controller means, or internet protocol multimedia core network subsystem means.

32. The apparatus according to claim 31, wherein the serving controller means is for providing a serving call session control function.

33. The apparatus according to claim 31, wherein the interrogating controller means is for providing an interrogating call session control function.

34. The apparatus according to claim 30, further comprising:
counting means for counting the simultaneous registrations.

35. An apparatus, comprising:
a receiver configured to receive at least one registration request to register a user requesting a service in a network entity in an internet protocol multimedia core network subsystem, and further configured to receive control information indicating at least one limitation on a plurality of simultaneous registrations, said control information indicating a restriction on a number of different contact addresses that can be simultaneously registered using a single public user identity; and
a controller configured to control the registration based on the control information,
wherein the controller is further configured to check whether at least one of said at least one limitation on simultaneous registrations by the contact addresses would be infringed by allowing the registration, wherein the controller is further configured to deny the registration when the controller shows that an allowed number of simultaneous registrations is exceeded.

36. The apparatus according to claim 35, wherein the apparatus comprises at least one of a serving controller and an interrogating controller.

37. The apparatus according to claim 36, wherein the serving controller is a serving call session control function.

38. The apparatus according to claim 36, wherein the interrogating controller is an interrogating call session control function.

39. The apparatus according to claim 35, wherein the controller is further configured to count the simultaneous registrations of the contact addresses.

40. The apparatus of claim 35, wherein contact information is assigned to the individual contact addresses to represent a network address of the corresponding user equipment used to register with the network entity.

41. The apparatus of claim 35, wherein a plurality of contact addresses are registered to access at least one service under a single subscription registered with the network entity.

42. The apparatus of claim 35, wherein a subscriber is registered with the network entity as being subscribed to a plurality of subscriptions for services.

43. The apparatus of claim 35, wherein at least one private user identity is registered with the network entity as representing a subscriber of a plurality of subscriptions for services.

44. The apparatus of claim 35, wherein a public user identity is used to represent a plurality of private user identities.

45. The apparatus of claim 35, wherein a private user identity is used to represent a plurality of public user identities.

46. The apparatus of claim 35, wherein a single public user identity is used to represent a plurality of contact addresses operating a corresponding plurality of user equipments which are simultaneously registered with the network entity under a single subscription registered with the network entity as the single public user identity.

47. The apparatus of claim 35, wherein the registration is controlled based on contact information assigned to the individual contact addresses.

48. A method, comprising:
receiving at least one registration request to register a user requesting a service in a network entity in an internet protocol multimedia core network subsystem;
receiving control information indicating at least one limitation on a plurality of simultaneous registrations, said control information indicating a restriction on a number of different contact addresses that can be simultaneously registered using a single public user identity;
controlling the registration based on the control information;
checking whether at least one of said at least one limitation on simultaneous registrations by the contact addresses would be infringed by allowing the registration; and
denying the registration when the checking shows that an allowed number of simultaneous registrations is exceeded.

49. The method according to claim 48, further comprising:
counting the simultaneous registrations of the contact addresses.

50. The method of claim 48, wherein contact information is assigned to the individual contact addresses to represent a network address of the corresponding user equipment used to register with the network entity.

51. The method of claim 48, wherein a plurality of contact addresses are registered to access at least one service under a single subscription registered with the network entity.

52. The method of claim 48, wherein a subscriber is registered with the network entity as being subscribed to a plurality of subscriptions for services.

53. The method of claim 48, wherein at least one private user identity is registered with the network entity as representing a subscriber of a plurality of subscriptions for services.

54. The method of claim 48, wherein a public user identity is used to represent a plurality of private user identities.

55. The method of claim 48, wherein a private user identity is used to represent a plurality of public user identities.

56. The method of claim 48, wherein a single public user identity is used to represent a plurality of contact addresses operating a corresponding plurality of user equipments which are simultaneously registered with the network entity under a single subscription registered with the network entity as the single public user identity.

57. The method of claim 48, wherein the registration is controlled based on contact information assigned to the individual contact addresses.

* * * * *